United States Patent
Mathai

(12) 
(10) Patent No.: US 6,697,422 B1
(45) Date of Patent: Feb. 24, 2004

(54) VARIABLE ENCODING LEVELS FOR ENCODING IN-BAND CONTROL MESSAGES IN WIRELESS TELECOMMUNICATION SYSTEMS

(75) Inventor: Stinson Samuel Mathai, Des Plaines, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,701

(22) Filed: Mar. 17, 2000

(51) Int. Cl.[7] .............................. H04B 1/38; H04L 5/16
(52) U.S. Cl. ........................ 375/222; 375/259; 370/329
(58) Field of Search ................................ 375/259, 265, 375/219, 222; 370/329, 331, 336, 468; 455/434, 436, 439, 442, 515; 714/786, 792, 708

(56) References Cited

U.S. PATENT DOCUMENTS

| | | | |
|---|---|---|---|
| 5,182,753 A | * 1/1993 | Dahlin et al. ................ | 714/749 |
| 5,199,031 A | * 3/1993 | Dahlin ......................... | 370/329 |
| 5,406,562 A | * 4/1995 | Roney, IV ................... | 714/704 |
| 5,596,604 A | * 1/1997 | Cioffi et al. ................. | 375/260 |
| 6,519,259 B1 | * 2/2003 | Baker et al. ............. | 370/395.4 |
| 6,519,279 B1 | * 2/2003 | Abdesselem et al. ....... | 375/219 |
| 6,535,497 B1 | * 3/2003 | Raith .......................... | 370/336 |

* cited by examiner

Primary Examiner—Phoung Phu

(57) ABSTRACT

An apparatus, method and system provide for variable encoding levels for encoding of in-band control messages in wireless telecommunication systems. In the various embodiments, ANSI-136 handoff and geolocation messages may be encoded utilizing different code rates, and are then transmitted in lieu of voice data in a fast associated control channel (FACCH). The preferred system embodiment includes a transceiver (base station) and a mobile switching center. The mobile switching center includes instructions to create a message for transmission during a communication session. When the message is necessary for continuation of the communication session, such as a handoff message, the mobile switching center includes further instructions to select a first encoding level from a plurality of encoding levels, such as a robust ¼ convolutional code, and to encode the message using the first encoding level to form the encoded message for transmission. When the message is not necessary for continuation of the communication session, such as a geolocation message, the mobile switching center includes instructions to select a second encoding level from the plurality of encoding levels, such as a less robust ½ convolutional code, and to encode the message using the second encoding level to form the encoded message for transmission. Variable encoding levels are also provided for corresponding variable channel conditions and message length.

45 Claims, 3 Drawing Sheets

VARIABLE ENCODING LEVELS FOR ENCODING IN-BAND CONTROL MESSAGES IN WIRELESS TELECOMMUNICATION SYSTEMS

FIELD OF THE INVENTION

The present invention relates in general to wireless telecommunication systems, and more particularly, to an apparatus, method and system for providing variable encoding levels, such as variable code rates, for encoding of in-band control messages in wireless telecommunication systems.

BACKGROUND OF THE INVENTION

Various wireless telecommunication services utilize forms of in-band or out-of-band signaling for various message types. For example, in the North American TDMA (time division multiple access) Digital Radio Link protocol (American National Standards Institute ("ANSI") 136 protocol) for wireless telecommunication, each downlink carrier signal includes several potential time slots or frames for communication with multiple mobile units, such as mobile telephones. Each such downlink time slot or frame is further logically divided into traffic channels, such as for voice communication, and control channels, such as for paging and support services (such as short message services). Similar systems are also utilized internationally, such as within the GSM and IDEN protocols.

Within protocols such as ANSI-136, each downlink frame includes various fields which have been allocated to specific types of information, such as a fixed number of bytes (or other bandwidth allocation) for traffic data such as voice communication, and a fixed number of bytes for control information consisting of user information and Slow Associated Control Channel (SACCH) data. Such SACCH data may be distributed among many frames transmitted over time, e.g., over twenty time slots, providing for a comparatively slow transmission of such control information.

When faster transmission of control information is necessary or desirable, such as for transmission of handoff messages, a Fast Associated Control Channel (FACCH) is also utilized in the ANSI-136 protocol. For FACCH data, in band signaling is used, such that the FACCH data is transmitted within fields previously used and reserved for speech data, thereby preempting and effectively replacing the speech data which otherwise would have been transmitted. Generally for FACCH data, only two time slots are required for the transmission of the complete control message. In addition, because of potentially poor channel conditions with potentially high bit error rates, such as those which may occur in a handoff situation, FACCH data is also generally encoded utilizing a robust, high rate code, such as a ¼ convolutional code, in an attempt to minimize bit error rates.

While such in-band signaling may be desirable for many circumstances, the corresponding loss of traffic data, such as the loss of voice communication data when replaced by FACCH data, may be highly undesirable under a wide variety of other circumstances, such as in an emergency situation of a "911" call. In addition, while utilization of FACCH data may be desirable for a variety of messages, such as transmission of important, emergency geolocation information, there also may be circumstances in which channel conditions are better and may not require such robust encoding, with its corresponding increased overhead and voice quality degradation.

As a consequence, a need remains to provide an apparatus, method and system for variable encoding levels, such as variable code rates, for encoding of in-band control messages, such as for FACCH data. Such variable encoding levels should provide for robust encoding of control messages under poor channel conditions, while providing another level of less robust encoding under other circumstances, such as in emergency situations or in more optimal channel conditions, to decrease control message overhead and minimize corresponding degradation or loss of traffic channel data, such as voice information.

SUMMARY OF THE INVENTION

The various method, apparatus and system embodiments of the present invention provide for variable levels (code rate) encoding of control information, such as FACCH data, which is transmitted in lieu of (in-band) traffic information, such as voice communication data. In addition to robust encoding of such data under poor channel conditions, a second level of less robust encoding is also provided for encoding of such data under other circumstances, such as in emergency situations, in more optimal or reasonable channel conditions, or in other circumstances in which avoiding a loss of voice information is desirable. The apparatus, method and system of the present invention, therefore, provide for the dynamic ability to decrease control message overhead and minimize corresponding degradation or loss of traffic channel data, such as voice information.

In the various embodiments, messages such as ANSI-136 handoff and geolocation messages may be encoded utilizing different code rates, and are then transmitted in lieu of voice data in a fast associated control channel (FACCH). The preferred system embodiment includes a transceiver (base station) and a mobile switching center. The transceiver provides for wireless transmission of an encoded message during the communication session. The mobile switching center includes instructions to create a message for transmission during a communication session. When the message is necessary for continuation of the communication session, such as a handoff message, or when channel conditions are unfavorable, or when the message has a comparatively shorter length, the mobile switching center includes instructions to select a first encoding level from a plurality of encoding levels, such as a robust or high code rate ¼ convolutional code, and to encode the message using the first encoding level to form the encoded message for transmission. When the message is not necessary for continuation of the communication session, such as a geolocation message, or when channel conditions are favorable, the mobile switching center includes instructions to select a second encoding level from the plurality of encoding levels, such as a less robust or lower code rate ½ convolutional code, and to encode the message using the second encoding level to form the encoded message for transmission.

The mobile switching center includes further instructions to replace voice data with a portion of the encoded message for transmission of the portion of the encoded message within a field otherwise reserved for voice data, and to continue to replace voice data with successive portions of the encoded message for transmission of a corresponding portion of the encoded message within a field otherwise reserved for voice data until the entire encoded message has been transmitted.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
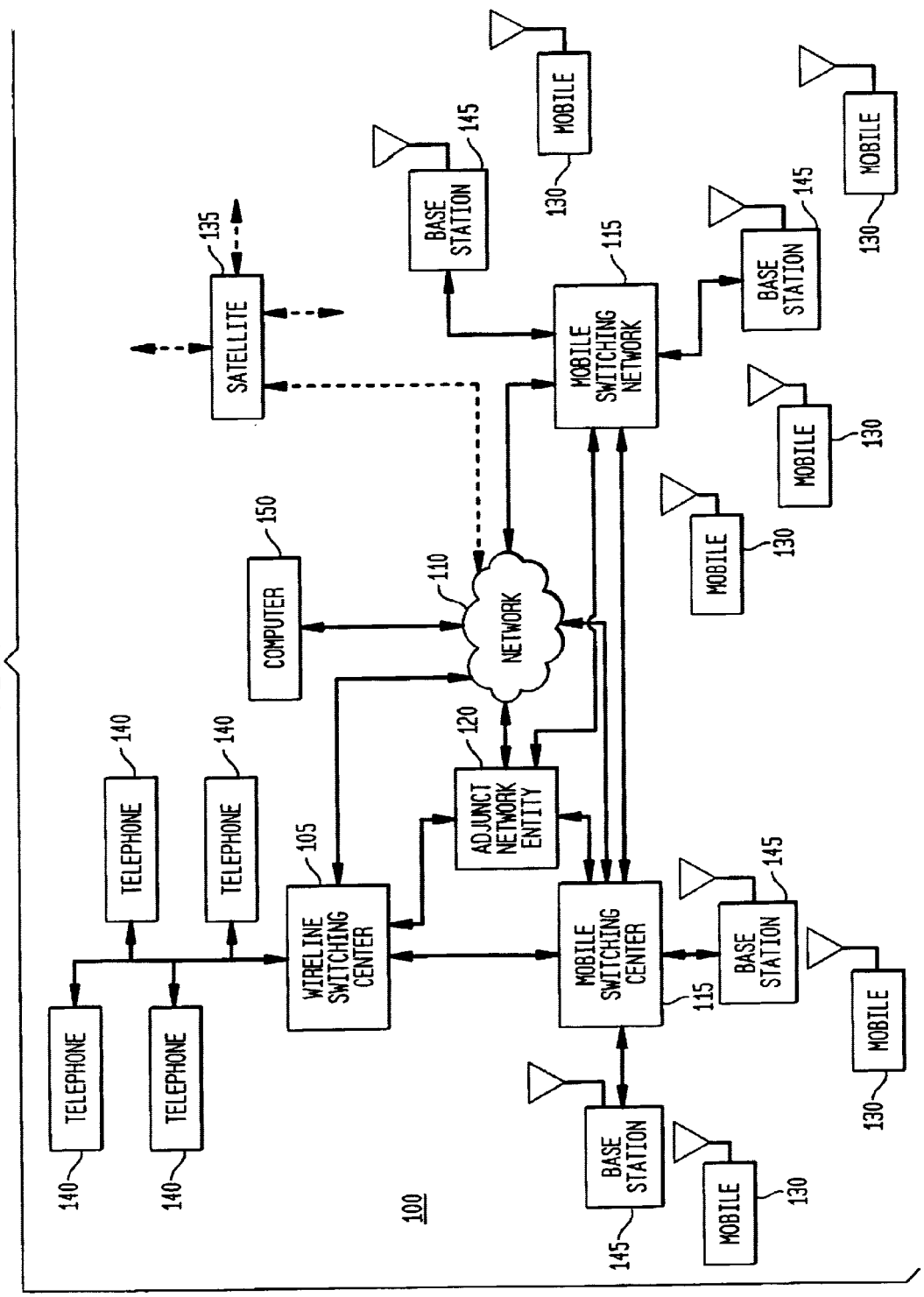
FIG. 1 is a block diagram illustrating a system embodiment to provide variable encoding levels for in-band control messages in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for variable code rate encoding of control information, such as FACCH data, which is transmitted in lieu of (in-band) traffic information, such as voice communication data. In accordance with the present invention, an apparatus, method and system are illustrated which provide such variable code rate encoding of control information, such as FACCH data. Also in accordance with the present invention, in addition to robust encoding of such data under poor channel conditions, a second level of less robust encoding is also provided for encoding of such data under other circumstances, such as in emergency situations, in more optimal or reasonable channel conditions, or in other circumstances in which avoiding a loss of voice information is desirable. The apparatus, method and system of the present invention, therefore, provide for the dynamic ability to decrease control message overhead and minimize corresponding degradation or loss of traffic channel data, such as voice information.

FIG. 1 is a block diagram illustrating a system embodiment 100 in accordance with the present invention. The system 100 includes one or more mobile switching centers ("MSCs") 115 and one or more wireline switching centers 105, which may also be connected via trunk and signaling lines to each other and to a broader network 110, such as a public switched telephone network ("PSTN") or an integrated services digital network ("ISDN") providing multiple telecommunication connections to other locations, such as providing a link to satellite 135, such as one or more global positioning system ("GPS") satellites. The system 100 may also include one or more intelligent network devices referred to as adjunct network entities 120, such as home location register ("HLR"), a visitor location register ("VLR"), another type of database 220, a service control point ("SCP"), a service node ("SN"), an intelligent peripheral ("IP"), or another intelligent network device. The adjunct network entity 120 is preferably connected or coupled to a wireline switching center 105 and to a MSC 115. The system 100 may also have a network (such as internet) connection to a computer 150 (or other network communication device).

The wireline switching center 105 is also generally connected to a plurality of telephones 240 or other customer premise equipment, while the MSCs 115 (via base stations 145 or other wireless transceivers) typically have a wireless link to the various mobile units 130, such as cellular telephones, within a particular geographic region, for voice and data communication. In addition, while the wireline and mobile switching centers 105 and 115 are usually physically separated due to regulatory and other historical reasons, these switching centers may also be combined into one or more switching centers having both wireline and wireless functionalities.

Continuing to refer to FIG. 1, under various circumstances, a MSC 115 may transmit various control and other system information to a mobile unit (via a base station 145). Such control and system information, for example, may include a page or a directive, such as a handoff directive or a geolocation directive. A handoff directive may occur when the system 100 (MSC 115 and/or serving base station 145) determines that the signal strength from the serving base station 145 to the mobile unit 130 is weaker compared to the signal strength from a target base station 145 to the mobile unit 130, indicating that channel conditions are no longer optimal (and higher bit error rates may occur); as a consequence, a mobile unit 130 is directed to "tune" to a channel, frequency or code of a different, selected target-base station 145. A geolocation directive may occur under various emergency situations, for example, when a service provider requires precise location information for the mobile unit 130, such as during an emergency 911 call. Such a geolocation directive may direct the mobile unit to obtain the geolocation information.

As mentioned above, when a mobile unit 130 is utilizing a traffic channel under the ANSI-136 protocol, such as for a voice communication, certain types of control messages are transmitted by the MSC 115 (via base station 145) utilizing either the Fast Associated Control Channel (FACCH) or the Slow Associated Control Channel (SACCH). Handoff directives, for example, are transmitted utilizing FACCH and, because of poor channel conditions (necessitating the handoff) with potentially high bit error rates, a robust (high code rate) encoding scheme is utilized to encode the handoff directive. Specifically, under ANSI-136, ¼ convolutional code is used, such that each bit of the directive results in four bits transmitted (¼ code rate). While such directives are transmitted comparatively quickly and accurately, and are justified given the potential loss of a connection if no handoff were to occur, there is an associated preemption of voice data and a corresponding voice transmission quality degradation.

Conversely, other types of control information are transmitted more slowly, without preemption of voice data. Under ANSI-136, such control information is transmitted via the SACCH, over many time slots, and utilizes a less robust (lower code rate) encoding scheme, namely, ½ convolutional encoding, such that each bit of the control message results in two bits transmitted (½ code rate).

Also under ANSI-136, other control messages are also transmitted utilizing FACCH. For example, when no voice communication is occurring, geolocation information is transmitted over an R-data channel. When a call is in progress, however, the traffic channel is in use and, accordingly, ANSI-136 requires that such geolocation information be transmitted utilizing FACCH, with its required ¼ convolutional encoding, increased overhead and corresponding loss of voice data.

In accordance with the present invention, and as discussed in greater detail below with reference to FIG. 3, various distinctions are made between and among situations in which such highly robust, high code rate and high overhead ¼ convolutional encoding should or should not be used. For example, while geolocation information should be transmitted rapidly (as the mobile unit 130 is typically within a moving vehicle), channel conditions may be considerably better or more optimal compared to channel conditions necessitating a handoff, with correspondingly lower bit error rates, and less need for high code rate encoding. In addition, there are circumstances, such as during a "911" emergency call, when it is highly desirable to minimize loss of voice information (and accordingly minimize preemption by FACCH data), while simultaneously transmitting such control information quickly (utilizing a channel such as FACCH). As a consequence, in accordance with the present invention, when control information is to be transmitted quickly to a mobile unit 130, various circumstances or parameters surrounding the communication session are evaluated to determine an appropriate level (robustness or code rate) of encoding. For example, in the emergency situation mentioned above, in which there are reasonable channel conditions with a correspondingly lower bit error rate, utilizing the present invention, geolocation information may be transmitted by the MSC 115 utilizing a less robust (or second level) of encoding, such as ½ convolutional encoding. Utilizing such less robust encoding, the preemption of voice data by FACCH geolocation information is cut significantly, resulting in considerably better speech quality, which may be quite important in those circumstances.

Figure 2:
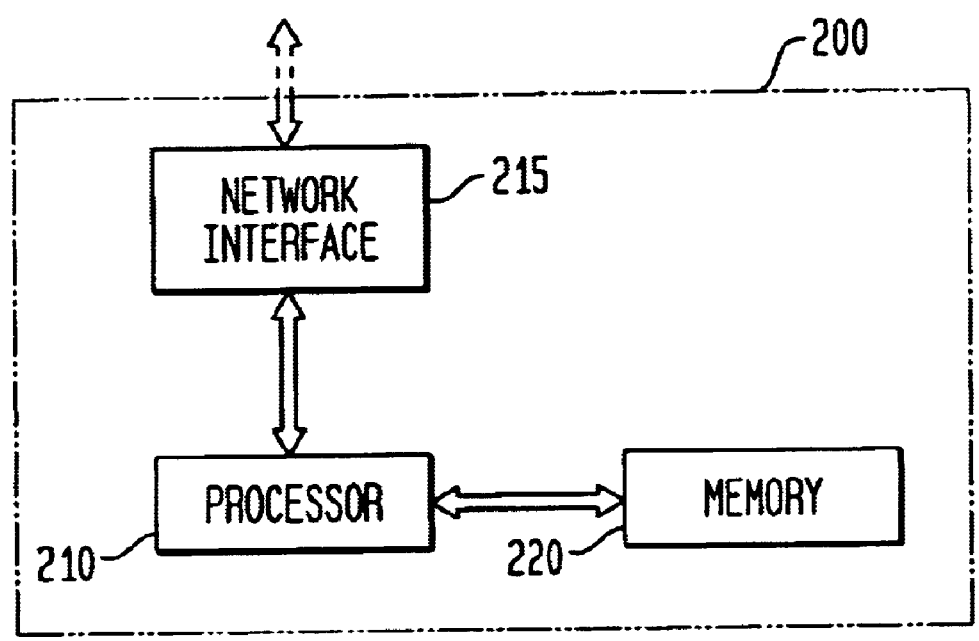
FIG. 2 is a block diagram illustrating an apparatus embodiment to provide variable encoding levels for in-band control messages in accordance with the present invention.

FIG. 2 is a block diagram illustrating an apparatus embodiment 200 in accordance with the present invention. Such an apparatus 200 preferably may be included within or distributed among an MSC 115 and/or an adjunct network entity 120 of a system 100. The apparatus 200 includes a processor 210, a network interface 215, and a memory 220. The network interface 215 is utilized to receive and transmit data, such as voice information, control messages, and other pertinent information. The memory 220 may be a magnetic hard drive, an optical storage device, or any other type of data storage apparatus. The memory 220 is used to store information pertaining to program instructions (discussed below), call management and call information, such as GPS information and channel conditions. The memory 220 performs such information storage, and may be included within database, HLR or VLR functions of adjunct network entities 120.

Continuing to refer to FIG. 2, the processor 210 may include a single integrated circuit ("IC"), or may include a plurality of integrated circuits or other components connected, arranged or grouped together, such as microprocessors, digital signal processors ("DSPs"), application specific integrated circuits ("ASICs"), field programmable gate arrays ("FPGAs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 3, with associated memory, such as microprocessor memory or additional RAM, ROM, EPROM or $E^2$PROM. The methodology of the invention, as discussed above with reference to FIGS. 1 and as discussed below with reference to FIG. 3, may be programmed and stored, in the processor 210 with its associated memory (and/or memory 220) and other equivalent components, as a set of program instructions (or equivalent configuration or other program) for subsequent execution when the processor 210 is operative (i.e., powered on and functioning). (Equivalently, when the processor 210 with its associated memory and other equivalent components are implemented in whole or part as FPGAs and/or ASICs, the FPGAs or ASICs also may be designed, configured or hard-wired to implement the methodology of the invention).

As mentioned above, in addition to incorporation within a MSC 115 or an adjunct network entity 120, such an apparatus 200 may be distributed among a MSC 115 or an adjunct network entity 120. For example, when the apparatus 200 is distributed among an MSC 115 and an adjunct network entity 120, with the memory 220 incorporated within the adjunct network entity 120 (such as an HLR or other database), with the processor 210 having components within either or both the MSC 115 and the adjunct network entity 120, and with the network interface 215 incorporated within the MSC 115.

Figure 3:
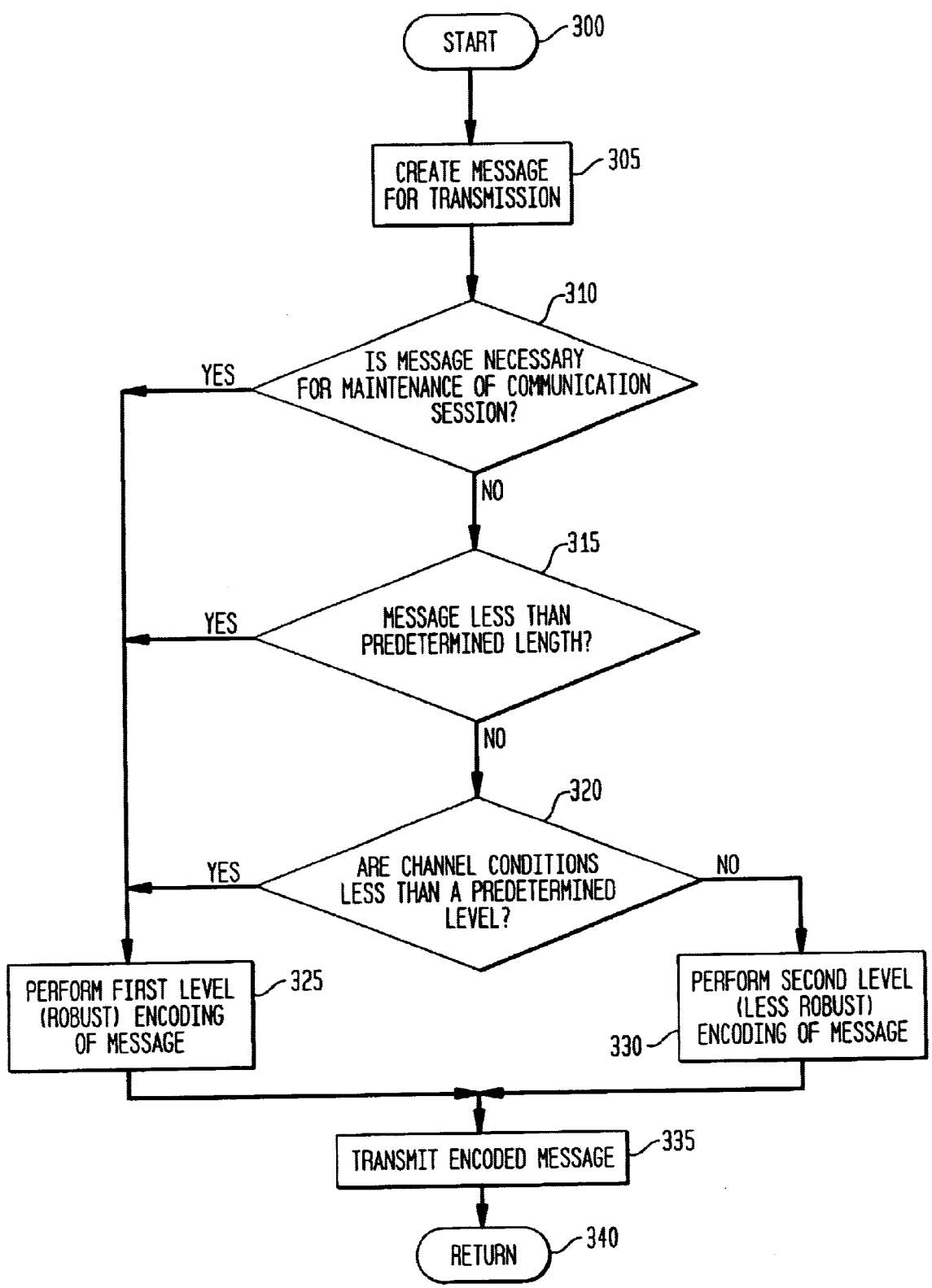
FIG. 3 is a flow diagram illustrating a method embodiment to provide variable encoding levels for in-band control messages in accordance with the present invention.

FIG. 3 is a flow diagram illustrating a method embodiment to provide variable code rate encoding of in-band control messages in accordance with the present invention. Beginning with start step 300, a control message is created for transmission, step 305, such as a handoff directive or a geolocation directive. In the system 100, this control message may be created by, for example, an MSC 115 or an adjunct network entity 120. Next, in step 310, the method determines whether the control message is necessary (or critical) for maintenance of the communication session. For example, an MSC 115 or an adjunct network entity 120 may determine that messages of a certain type, such as handoff messages, are necessary in step 310, as a communication session may be lost or dropped if a handoff does not occur. Conversely, other message types, such as geolocation messages, are independent from and thereby not necessary or critical to the maintenance of the communication session. As a consequence, when the control message is necessary for maintenance of the communication session in step 310, the method proceeds to step 325, and provides a first level of encoding of the control message, such as robust or high code rate encoding (e.g., ¼ convolutional encoding). When the control message is not necessary for maintenance of the communication session in step 310, the method proceeds to step 315.

In step 315, the method determines whether there would be any significant gain achieved utilizing a less robust, lower code rate encoding, i.e., would the resulting smaller (or shorter) encoded message provide sufficiently less preemption of voice data in transmission to justify switching to a lower code rate encoding scheme. In general, control messages that are sufficiently or comparatively short prior to encoding, if encoded using a less robust scheme, may not result in sufficient savings of preempted voice data compared to encoding the message using a more robust scheme, and may or may not justify the added complexity of switching to the lower code rate. As a consequence, in step 315, when the control message (prior to coding) is less than a predetermined length (e.g., the control message has less than a predetermined number of bytes), the method proceeds to step 325, and provides the first level of encoding of the control message, such as robust or high code rate encoding. When the control message (prior to coding) is greater than (or equal to) the predetermined length (e.g. the control message has at least the predetermined number of bytes), such that a lower code rate encoding would provide a significant benefit in maintaining voice transmission quality (by avoiding a significant loss of voice data), the method proceeds to step 320.

In step 320, the method determines whether channel conditions will allow for use of a second, less robust level of encoding. When channel conditions are less or worse than a predetermined level in step 320, such as channel conditions approaching a handoff situation, indicating that more robust encoding would be desirable, the method proceeds to step 325, and provides the first level of encoding of the control message. When channel conditions are greater or better than the predetermined level in step 320, indicating that a less robust encoding scheme would be sufficient, then the method proceeds to step 330. In step 330, the method (via MSC 115 or adjunct network entity 120) performs a second level of encoding of the control message, such as utilizing a less robust or lower code rate encoding scheme (e.g., ½ convolutional encoding). Following the encoding of either step 325 or step 330, the encoded message is transmitted in step 335, such as transmitted via FACCH in an ANSI-136 downlink, and the method may end, return step 340.

At the receiving end, the mobile unit 130 is preferably also configured for variable level decoding of the various control and other messages which may be transmitted. In the preferred embodiment, for example, the mobile unit 130 may be configured for a default decoding using a ½ convolutional code decoder, for both voice and control messages; in the event that the resulting decoded information is meaningless or unintelligible, the received information is decoded again, but utilizing a ¼ convolutional code decoder.

While illustrated with regard to two encoding levels in FIG. 3, the methodology of the invention, as discussed above, may be extended to additional encoding levels. In addition, such selection of an encoding level, such as selection of a third or fourth level of encoding from a plurality of various encoding levels, may be implemented depending upon any desired circumstances or conditions (in addition to the various conditions mentioned above, such as channel conditions, message length, and necessity for ongoing communication).

Numerous advantages of the present invention may be apparent from the above discussion. The various embodiments provide for variable code rate encoding of control information, such as FACCH data, which is transmitted in lieu of (in-band) traffic information, such as voice communication data. Also in accordance with the present invention, in addition to robust encoding of such data under poor channel conditions, a second level of less robust encoding is also provided for encoding of such data under other circumstances, such as in emergency situations, in more optimal or reasonable channel conditions, or in other circumstances in which avoiding a loss of voice information is desirable. The apparatus, method and system of the present invention, therefore, provide for the dynamic ability to decrease control message overhead and minimize corresponding degradation or loss of traffic channel data, such as voice information.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method of providing variable encoding levels for encoding of messages for transmission in a communication session, the method comprising:

(a) creating a message for transmission during the communication session;

(b) selecting an encoding level from a plurality of encoding levels for the message based upon one or more of a set of encoding selection criteria, the criteria including whether the message is necessary for maintenance of the communication session, whether the message is less than a predetermined length, and whether channel conditions are less than a predetermined level;

(c) encoding the message using the selected encoding level; and (d) transmitting the encoded message.

2. The method of claim 1, wherein step (d) further comprises:

transmitting the encoded message in-band.

3. The method of claim 1, wherein step (d) further comprises:

replacing voice data with a portion of the encoded message and transmitting the portion of the encoded message within a field otherwise reserved for voice data.

4. The method of claim 3, further comprising:

continuing to replace voice data with successive portions of the encoded message and transmitting a corresponding portion of the encoded message within a field otherwise reserved for voice data until the entire encoded message has been transmitted.

5. The method of claim 1, wherein a first encoding level has a higher code rate compared to a second encoding level.

6. The method of claim 1, wherein a first encoding level is more robust compared to a second encoding level.

7. The method of claim 1, wherein a first encoding level is implemented as a ¼ convolutional code.

8. The method of claim 1, wherein a second encoding level is implemented as a ½ convolutional code.

9. A method of providing variable encoding levels for encoding of messages for transmission in a communication session, the method comprising:

(a) creating a message for transmission during the communication session;

(b) when the message is necessary for continuation of the communication session, selecting a first encoding level from a plurality of encoding levels and encoding the message using the first encoding level to form an encoded message;

(c) when the message is not necessary for continuation of the communication session, selecting a second encoding level from the plurality of encoding levels and encoding the message using the second encoding level to form the encoded message;

(d) when the message is shorter than a predetermined length, selecting the first encoding level as a comparatively higher rate code from a plurality of code rates within the plurality of encoding levels, and encoding the message using the first encoding level to form the encoded message; and (e) transmitting the encoded message.

10. A method of providing variable encoding levels for encoding of messages for transmission in a communication session, the method comprising:

(a) creating a message for transmission during the communication session;

(b) when the message is necessary for continuation of the communication session, selecting a first encoding level from a plurality of encoding levels and encoding the message using the first encoding level to form an encoded message;

(c) when the message is not necessary for continuation of the communication session, selecting a second encoding level from the plurality of encoding levels and encoding the message using the second encoding level to form the encoded message; and (d) when channel conditions are better than a predetermined level, selecting the second encoding level as a comparatively lower rate code from a plurality of code rates within the plurality of encoding levels, and encoding the message using the second encoding level to form the encoded message; and (e) transmitting the encoded message.

11. The method of claim 10, further comprising:

when channel conditions are worse than a predetermined level, encoding the message using the first encoding level to form the encoded message.

12. The method of claim 1, wherein the message is an ANSI-136 control message for transmission within a fast associated control channel (FACCH).

13. The method of claim 1, wherein the message is an ANSI-136 handoff message for transmission within a fast associated control channel (FACCH).

14. The method of claim 1, wherein the message is an ANSI-136 geolocation message for transmission within a fast associated control channel (FACCH).

15. The method of claim 14, wherein the geolocation message is encoded using the second encoding level, and wherein the second encoding level is a ½ convolutional code.

16. An apparatus for providing variable encoding levels for encoding of messages for transmission in a communication session, the apparatus comprising:

a network interface for transmission of an encoded message during the communication session;

a memory, the memory storing a plurality of encoding levels; and a processor coupled to the network interface and to the memory, wherein the processor includes instructions to create a message for transmission during the communication session; when the message is necessary for continuation of the communication session, the processor including further instructions to select a first encoding level from the plurality of encoding levels and to encode the message using the first encoding level to form the encoded message; and when the message is not necessary for continuation of the communication session, the processor including further instructions to select a second encoding level from the plurality of encoding levels and to encode the message using the second encoding level to form the encoded message.

17. The apparatus of claim 16, wherein the processor includes further instructions to replace voice data with a portion of the encoded message for transmission of the portion of the encoded message within a field otherwise reserved for voice data.

18. The apparatus of claim 17, wherein the processor includes further instructions to continue to replace voice data with successive portions of the encoded message for transmission of a corresponding portion of the encoded message within a field otherwise reserved for voice data until the entire encoded message has been transmitted.

19. The apparatus of claim 16, wherein the first encoding level has a higher code rate compared to the second encoding level.

20. The apparatus of claim 16, wherein the first encoding level is more robust compared to the second encoding level.

21. The apparatus of claim 16, wherein the first encoding level is implemented as a ¼ convolutional code.

22. The apparatus of claim 16, wherein the second encoding level is implemented as a ½ convolutional code.

23. The apparatus of claim 16, wherein the processor includes further instructions, when the message is shorter than a predetermined length, to select the first encoding level as a comparatively higher rate code from a plurality of code rates within the plurality of encoding levels, and to encode the message using the first encoding level to form the encoded message.

24. The apparatus of claim 16, wherein the processor includes further instructions, when channel conditions are better than a predetermined level, to select the second encoding level as a comparatively lower rate code from a plurality of code rates within the plurality of encoding levels, and to encode the message using the second encoding level to form the encoded message.

25. The apparatus of claim 16, wherein the processor includes further instructions, when channel conditions are worse than a predetermined level, to encode the message using the first encoding level to form the encoded message.

26. The apparatus of claim 16, wherein the message is an ANSI-136 control message for transmission within a fast associated control channel (FACCH).

27. The apparatus of claim 16, wherein the message is an ANSI-136 handoff message for transmission within a fast associated control channel (FACCH).

28. The apparatus of claim 16, wherein the message is an ANSI-136 geolocation message for transmission within a fast associated control channel (FACCH).

29. The apparatus of claim 28, wherein the geolocation message is encoded using the second encoding level, and wherein the second encoding level is a ½ convolutional code.

30. The apparatus of claim 16, wherein the apparatus is included within a mobile switching center.

31. A system for providing variable encoding levels for encoding of American National Standards Institute protocol (ANSI-136) messages for transmission in a communication session, the system comprising:

a transceiver for wireless transmission of an encoded message during the communication session; and a mobile switching center coupled to the transceiver, wherein the mobile switching center includes instructions to create a message for transmission during the communication session; when the message is a handoff message, the mobile switching center including further instructions to encode the handoff message using a ¼ convolutional code to form the encoded message for transmission in a fast associated control channel; when the message is shorter than a predetermined length, the mobile switching center including further instructions to encode the message using a ¼ convolutional code to form the encoded message for transmission in a fast associated control channel; when the message is a geolocation message and when channel conditions are better than a predetermined level, the mobile switching center including further instructions to encode the geolocation message using a ½ convolutional code to form the encoded message for transmission in a fast associated control channel; when the message is a not necessary for continuation of the communication session and when channel conditions are better than the predetermined level, the mobile switching center including further instructions to encode the message using a ½ convolutional code to form the encoded message for transmission in a fast associated control channel; when the message is a not necessary for continuation of the communication session and when channel conditions are worse than the predetermined level, the mobile switching center including further instructions to encode the message using a ¼ convolutional code to form the encoded message for transmission in a fast associated control channel; wherein the mobile switching center includes further instructions to replace voice data with a portion of the encoded message for transmission of the portion of the encoded message within a field otherwise reserved for voice data; and wherein the mobile switching center includes further instructions to continue to replace voice data with successive portions of the encoded message for transmission of a corresponding portion of the encoded message within a field otherwise reserved for voice data until the entire encoded message has been transmitted.

32. A system for providing variable encoding levels for encoding of messages for transmission in a communication session, the system comprising:

a transceiver for wireless transmission of an encoded message during the communication session; and a mobile switching center coupled to the transceiver, wherein the mobile switching center includes instructions to create a message for transmission during the communication session; the mobile switching center including further instructions to encode the message using one of a plurality of encoding levels based upon one of more of a set of encoding selection criteria, the criteria including whether the message is necessary for maintenance of the communication session, whether the message is less than a predetermined length, and whether channel conditions are less than a predetermined level to form the encoded message.

33. The system of claim 32, wherein the mobile switching center includes further instructions to replace voice data with a portion of the encoded message for transmission of the portion of the encoded message within a field otherwise reserved for voice data.

34. The system of claim 33, wherein the mobile switching center includes further instructions to continue to replace voice data with successive portions of the encoded message for transmission of a corresponding portion of the encoded message within a field otherwise reserved for voice data until the entire encoded message has been transmitted.

35. The system of claim 32, wherein a first encoding level has a higher code rate compared to a second encoding level.

36. The system of claim 32, wherein a first encoding level is more robust compared to a second encoding level.

37. The system of claim 32, wherein a first encoding level is implemented as a ¼ convolutional code.

38. The system of claim 32, wherein a second encoding level is implemented as a ½ convolutional code.

39. A system for providing variable encoding levels for encoding of messages for transmission in a communication session, the system comprising:

a transceiver for wireless transmission of an encoded message during the communication session; and a mobile switching center coupled to the transceiver, wherein the mobile switching center includes instructions to create a message for transmission during the communication session; when the message is necessary for continuation of the communication session, the mobile switching center including further instructions to select a first encoding level from the plurality of encoding levels and to encode the message using the first encoding level to form the encoded message; and when the message is not necessary for continuation of the communication session, the mobile switching center including further instructions to select a second encoding level from the plurality of encoding levels and to encode the message using the second encoding level to form the encoded message, wherein the mobile switching center includes further instructions, when the message is shorter than a predetermined length, to select the first encoding level as a comparatively higher rate code from a plurality of code rates within the plurality of encoding levels, and to encode the message using the first encoding level to form the encoded message.

40. A system for providing variable encoding levels for encoding of messages for transmission in a communication session, the system comprising:

a transceiver for wireless transmission of an encoded message during the communication session; and a mobile switching center coupled to the transceiver, wherein the mobile switching center includes instructions to create a message for transmission during the communication session; the mobile switching center including further instructions to encode the message using one of a plurality of encoding levels based upon encoding selection criteria, the criteria including whether the messages is necessary for maintenance of the communication session, whether the message is less than a predetermined length, and whether channel conditions are less than a predetermined level to form the encoded message, wherein the mobile switching center includes further instructions, when channel conditions are better than a predetermined level, to select the second encoding level as a comparatively lower rate code from a plurality of code rates within the plurality of encoding levels, and to encode the message using the second encoding level to form the encoded message.

41. The system of claim 40, wherein the mobile switching center includes further instructions, when channel conditions are worse than a predetermined level, to encode the message using the first encoding level to form the encoded message.

42. The system of claim 32, wherein the message is an ANSI-136 control message for transmission within a fast associated control channel (FACCH).

43. The system of claim 32, wherein the message is an ANSI-136 handoff message for transmission within a fast associated control channel (FACCH).

44. The system of claim 32, wherein the message is an ANSI-136 geolocation message for transmission within a fast associated control channel (FACCH).

45. The system of claim 32, wherein the geolocation message is encoded using the second encoding level, and wherein the second encoding level is a ½ convolutional code.

* * * * *